United States Patent
Chapman

(10) Patent No.: US 7,543,824 B2
(45) Date of Patent: Jun. 9, 2009

(54) HYDRAULIC SUSPENSION UNIT

(75) Inventor: Keith Michael Chapman, Corringham (GB)

(73) Assignee: CNH America LLC, New Holland, PA (US)

( * ) Notice: Subject to any disclaimer, the term of this patent is extended or adjusted under 35 U.S.C. 154(b) by 296 days.

(21) Appl. No.: 11/212,169

(22) Filed: Aug. 26, 2005

(65) Prior Publication Data

US 2006/0049561 A1 Mar. 9, 2006

(30) Foreign Application Priority Data

Sep. 9, 2004 (GB) ................. 0419965.9

(51) Int. Cl.
*B60G 17/04* (2006.01)
(52) U.S. Cl. .................................. 280/5.514
(58) Field of Classification Search ............. 280/5.514, 280/5.515, 124.158, 124.159, 124.161, 6.157, 280/6.159, 124.16; 188/266.2, 282.2, 282.6, 188/322.13, 322.2
See application file for complete search history.

(56) References Cited

U.S. PATENT DOCUMENTS

| | | | |
|---|---|---|---|
| 5,480,011 A | 1/1996 | Nagai et al. | |
| 5,588,510 A * | 12/1996 | Wilke | 188/266.6 |
| 5,810,128 A | 9/1998 | Eriksson et al. | |
| 5,988,332 A | 11/1999 | Marzocchi et al. | |
| 6,029,958 A | 2/2000 | Larsson et al. | |
| 6,249,728 B1 * | 6/2001 | Streiter | 701/37 |
| 6,427,986 B1 | 8/2002 | Sakai et al. | |
| 6,834,736 B2 * | 12/2004 | Kramer et al. | 180/89.12 |
| 2004/0045763 A1 | 3/2004 | Woods et al. | |
| 2005/0252699 A1* | 11/2005 | Schedgick et al. | 180/41 |

* cited by examiner

*Primary Examiner*—Faye M. Fleming
(74) *Attorney, Agent, or Firm*—Patrick M. Sheldrake; John William Stader; Michael G. Harms

(57) ABSTRACT

A hydraulic suspension unit for the front axle suspension of a tractor, comprises a hydraulic jack having a cylinder body, a piston arranged within the cylinder body to define two variable volume working chambers, a piston rod connected to the piston and sealingly guided in the cylinder body, and anchoring blocks on the ends of the cylinder body and of the piston rod for connecting the hydraulic jack to components of the suspension that are movable relative to one another. The suspension unit further comprising a valve body having valves connected to regulate the flow of hydraulic fluid to and from the working chambers of the jack. In the invention, the valve body is directly mounted on the anchoring block of the cylinder body on its side remote from the anchoring block of the piston rod.

6 Claims, 2 Drawing Sheets

HYDRAULIC SUSPENSION UNIT

FIELD OF THE INVENTION

The present invention relates to a hydraulic suspension unit, in particular to a suspension unit suited for use in the front suspension of a tractor.

BACKGROUND OF THE INVENTION

It is known to provide a tractor with a suspended front axle, in which the axle is connected to the engine and transmission tunnel (which constitutes the chassis of the tractor) by means of a panhard rod and a suspension unit that comprises a hydraulic jack with a double acting piston. An example of such an existing hydraulic circuit and hydraulic jack is shown in FIG. 1 of the accompanying drawings. In FIG. 1, the jack 10, has a cylinder body 12, a piston 14, a piston rod 16 and two hydraulic working chambers 18 and 20 on opposite sides of the piston 14. Anchoring blocks 22 and 24 are provided on the cylinder body 12 and the piston rod 16 for connecting the hydraulic jack 10 to the chassis and the panhard rod of the tractor, respectively. Extending or retracting the jack 10 has the effect of varying the distance between the front axle and the chassis.

The two working chambers 18 and 20 of the hydraulic jack 10 are connected by means of flexible hydraulic hoses 26 and 20 to a remotely located valve block 30, shown in dotted lines in the drawing. The valve block 30 comprises two solenoid operated two-port valves 32 and 34 each of which acts as a non-return valve when not energized and establishes a direct connection between its two ports when energized. The valve block 30 has four connectors, namely connectors 36 and 38 for the hoses 26 and 28 leading to the hydraulic jack 10, a connector 40 for a line leading to an accumulator 42 and a connector 44 for a supply/feed line 46 from a second valve block (not shown in the drawing). The second valve block is connected to a pressure line and a return line and acts to pressurize the line 46 when the suspension is to be raised and to relieve the pressure in the line 46 when the suspension is to be lowered. When no adjustment is to be made to the height of the suspension, the line 46 is simply shut off and during such time the valves 32 and 34 in the valve block 30 are controlled to act in conjunction with the accumulator 42 to cushion and damp movements of the front axle so as to reduce the shocks transmitted to the tractor chassis. As the hydraulic circuit is itself known, its operation will be clear to the person skilled in the art and it need not therefore be described in greater detail within the present context.

A problem is encountered in the front axle suspension system of existing tractors on account of the remote location of the valve block 30 from the hydraulic jack 10. The long hoses 26 and 28 connecting the valves 32 and 34 to working chambers of the jack 10 tend to flex and stretch when placed under pressure. Their resulting change in volume introduces a sponginess that reduces the response and performance of the suspension system.

SUMMARY OF THE INVENTION

With a view to mitigating the foregoing disadvantage, there is provided in accordance with the present invention a hydraulic suspension unit for the front axle suspension of a tractor. The unit comprises: a hydraulic jack having a cylinder body, a piston arranged within the cylinder body to define two variable volume working chambers, a piston rod connected to the piston and sealingly guided in the cylinder body, and anchoring blocks on the ends of the cylinder body and of the piston rod for connecting the hydraulic jack to components of the suspension that are movable relative to one another. The suspension unit further comprises a valve body having valves connected to regulate the flow of hydraulic fluid to and from the working chambers of the jack, the valve body being directly mounted on the anchoring block of the cylinder body on the side thereof remote from the anchoring block of the piston rod.

The invention teaches mounting the control valves that regulate the flow of hydraulic fluid to and from the working chambers directly on one end of the jack, that is to say not between the two anchoring blocks. This enables the length of the conduit connecting the control valves to the working chamber to be minimized without affecting the length of the hydraulic jack as measured between its anchoring points.

Because the valve body is mounted directly on the hydraulic jack, it is possible to use rigid conduits instead of flexible hoses to connect the valves to the working chambers, thereby also avoiding the sponginess resulting from the use of flexible hoses.

In a preferred embodiment of the invention, the conduits connecting the valves to the working chambers are formed at least in part by bores formed within the valve body and in the anchoring block of the cylinder body. In this case, the valve body may be formed as a manifold that is secured and sealed relative to the anchoring block of the cylinder body.

The conduit connecting the control valves to the working chamber on the rod side of the piston preferably includes a rigid tube formed separately from the cylinder body that extends externally from the end of the cylinder body from which the piston rod projects to the anchoring block at the opposite end of the cylinder body.

In addition to establishing connections with the working chambers of the hydraulic jack, the valve body is preferably formed with connectors to receive a supply line and a line leading to an accumulator, thereby avoiding the need in the prior art to provide such connectors on the hydraulic jack itself. It is further possible, if desired, to mount the accumulator directly onto the valve.

DETAILED DESCRIPTION OF THE EXEMPLARY EMBODIMENTS

Figure 1:
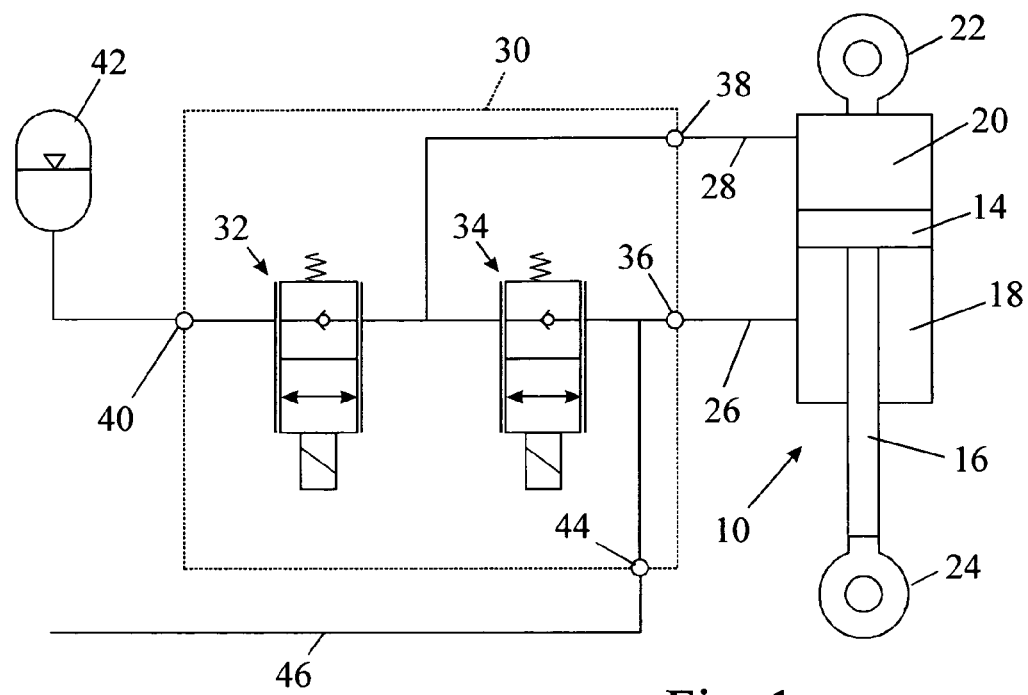
FIG. 1 shows a diagram of a known hydraulic jack and valve block used in the front axle suspension of a tractor.
Figure 2:
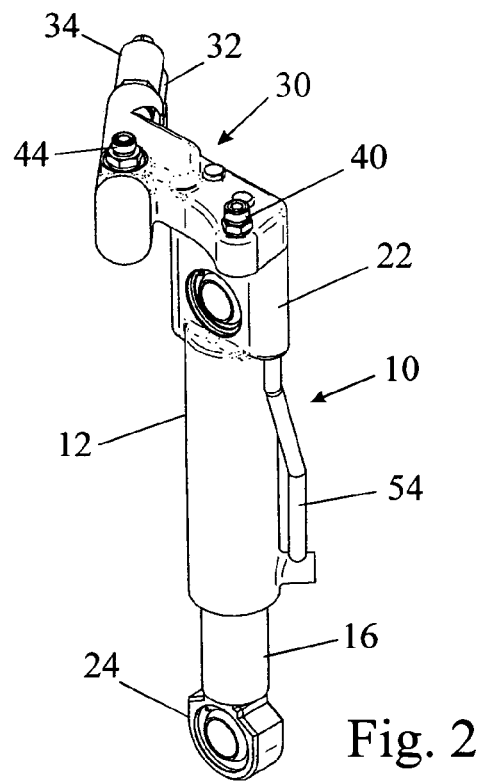
FIG. 2 shows a perspective view of a suspension unit of the invention.

The present invention eliminates the need for the hoses 26 and 28 shown in FIG. 1 by integrating the valve block 30 of FIG. 1 into the hydraulic jack 10 to form a suspension unit as shown in FIG. 2. The suspension unit is comprised of a jack 10 and an valve block 30 secured to one end of the jack 10.

Figure 3:
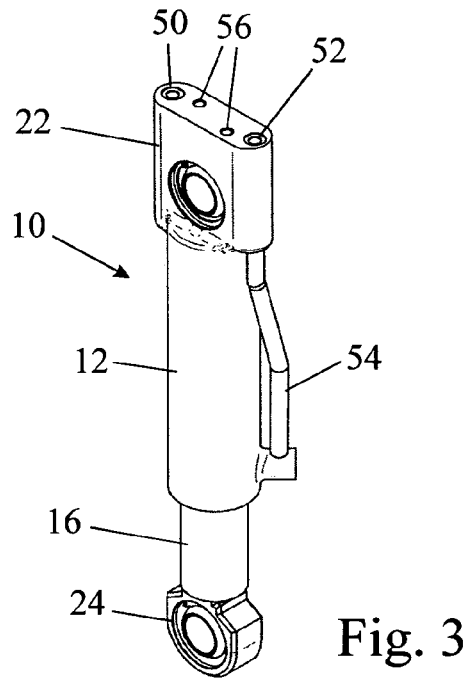
FIG. 3 shows a perspective view of the hydraulic jack of the suspension unit shown in FIG. 2.

The hydraulic jack 10, shown on its own in FIG. 3, has a conventional anchoring block 24 connected to the piston rod 16. On the other end, the anchoring block 22 connected to the cylinder body 12 has two bores 50 and 52 that pass through it. The bore 50 communicates with the piston-side working chamber 20 of the jack 10 whereas the bore 52 is a through bore which communicates at its other end with a separately formed tube 54 that is connected to the rod-side working chamber 18. In addition, the anchoring block 22 is formed with threaded holes 56 for receiving bolts that secure the valve block 30.

Figure 4:
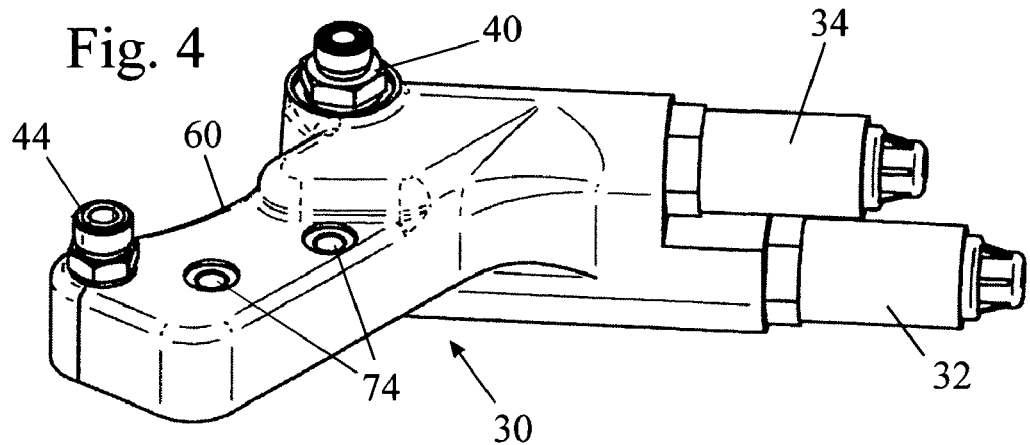
FIG. 4 shows a perspective view of the valve block of the suspension unit shown in FIG. 2.
Figure 5:
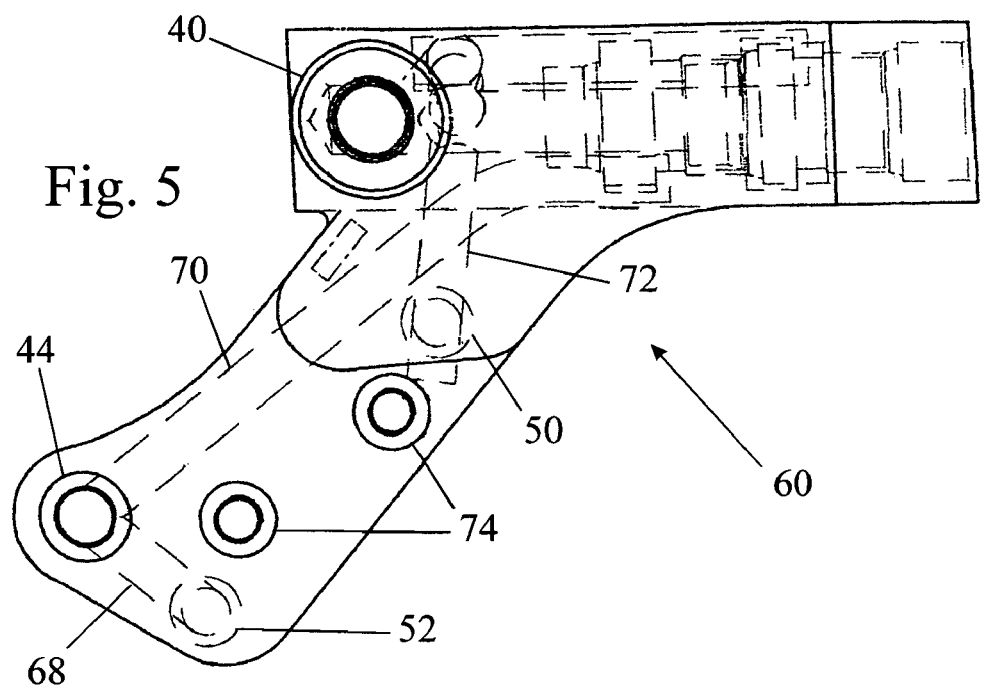
FIG. 5 shows a plan view of the valve block of FIG. 4 showing in dotted lines the layout of the conduits formed internally within the valve block.
Figure 6:
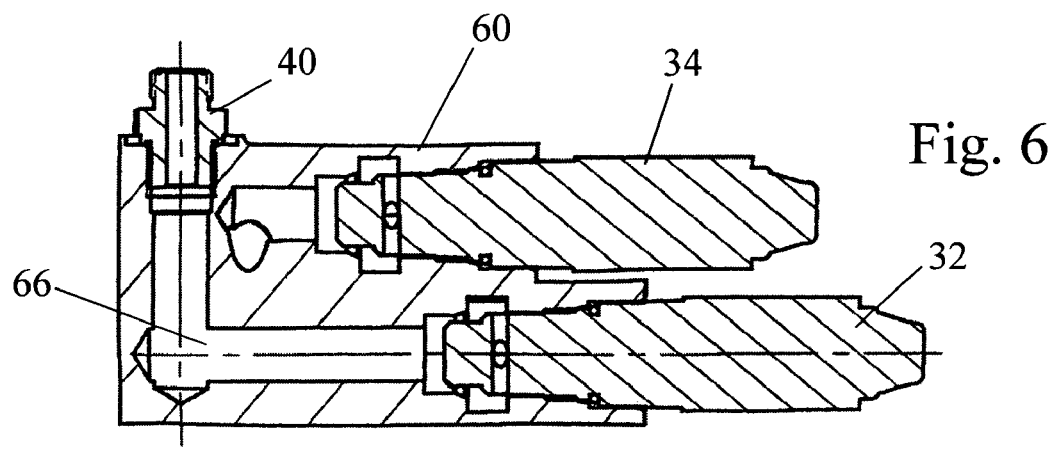
FIG. 6 shows a section taken along the line A-A in FIG. 5.

The valve block 30 is separately shown in detail in FIGS. 4 to 6 and has holes 74 for bolts which screw into the holes 56 to secure the valve block 30 to the anchoring block 22 of the jack 10. The valve block 30 comprises a manifold 60 having two parallel and adjacent bores which receive the two solenoid valves 32 and 34. These valves are constructed as cartridges that fit in the bores in the manifold 60 as shown by the section of FIG. 6. The latter figure also shows a conduit 66 formed within the manifold 60 which leads from the valve 34 to the connector 40 for the accumulator 42.

Referring now to the plan view of FIG. 5, the manifold 30 can be seen to be formed with a bore 68 leading from the connector 44 to the conduit 52 leading to the rod-side working chamber 18. The same connector 44 for the feed/supply line is connected by an internal conduit 70 to one of the ports of the valve 34. The conduit 50 that communicates with the piston-side working chamber 20 is connected by a conduit 72 to one port of each of the two valves 32 and 34.

It can thus be seen that the valve block 30 comprises a single manifold 60 which can be bolted on to the hydraulic jack 10 to provide all the necessary connections between the working chambers 18 and 20 and the valves 32 and 34. The valve block also includes the connectors 40 and 44 to receive the supply/feed line 46 and the line leading to the accumulator 42. Furthermore, the resulting suspension unit does not require any modification to the distance between mounting points of the hydraulic jack.

It will be clear to the person skilled in the art that various modifications may be made to the suspension unit without departing from the scope of the invention as set forth in the appended claims. For example, the types of valves used in the block 30 and the hydraulic circuit connecting the valves to each other and to the working chambers of the hydraulic jack may be different from those described and illustrated. Furthermore, the accumulator 42 may be mounted directly on the valve body 30 and in turn directly mounted on the jack anchoring block 22 of the cylinder body 12.

What is claimed is:

1. A hydraulic suspension unit for the front axle suspension of a tractor, comprising
a hydraulic jack having a cylinder body;
a piston arranged within the cylinder body to define two variable volume working chambers;
a piston rod connected to the piston and sealingly guided in the cylinder body;
anchoring blocks on the ends of the cylinder body and of the piston rod for connecting the hydraulic jack to components of the suspension that are movable relative to one another, each anchoring block having an anchorage point the suspension unit further comprising a valve body having control valves connected to regulate the flow of hydraulic fluid to and from the working chambers of the jack; and
the anchoring block on the end of the cylinder body having a portion which extends longitudinally beyond the connecting line between the anchorage points, said portion having a mounting surface facing upwardly away from the cylinder body and comprising internal bores leading from the mounting surface to the working chambers of the hydraulic jack; the valve body being directly mounted on the anchoring block of the cylinder body on the side thereof remote from the anchoring block of the piston rod.

2. A suspension unit as claimed in claim 1, wherein tile valve body is formed as a manifold that is secured and sealed relative to the anchoring block of the cylinder body.

3. A suspension unit as claimed in claim 1, wherein a conduit connecting the control valves to the working chamber on the rod side of the piston includes a rigid tube formed separately from the cylinder body that extends externally from the end of the cylinder body from which the piston rod projects to the anchoring block at the opposite end of the cylinder body.

4. A suspension unit as claimed in claim 1, wherein in addition to establishing connections with the working chambers of the hydraulic jack, the valve body is formed with connectors to receive a supply line and a line leading to an accumulator.

5. A suspension unit as claimed in claim 2, wherein a conduit connecting the control valves to the working chamber on the rod side of the piston includes a rigid tube formed separately from the cylinder body that extends externally from the end of the cylinder body from which the piston rod projects to the anchoring block at the opposite end of the cylinder body.

6. A suspension unit as claimed in claim 1, wherein in addition to establishing connections with the working chambers of the hydraulic jack, the valve body is formed with a connector to receive a supply line and an accumulator is mounted directly on the valve.

* * * * *